United States Patent
Müller et al.

(10) Patent No.: US 8,316,711 B2
(45) Date of Patent: Nov. 27, 2012

(54) APPARATUS FOR ASCERTAINING AND/OR MONITORING A PROCESS VARIABLE OF A MEDIUM

(75) Inventors: Alexander Müller, Sasbach-Jechtingen (DE); Sascha D'Angelico, Rümmingen (DE); Walter Rombach, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 567 days.

(21) Appl. No.: 12/309,831

(22) PCT Filed: Jun. 28, 2007

(86) PCT No.: PCT/EP2007/056512
§ 371 (c)(1),
(2), (4) Date: Oct. 9, 2009

(87) PCT Pub. No.: WO2008/015057
PCT Pub. Date: Feb. 7, 2008

(65) Prior Publication Data
US 2010/0043554 A1 Feb. 25, 2010

(30) Foreign Application Priority Data

Aug. 2, 2006 (DE) .......................... 10 2006 036 397
Mar. 19, 2007 (DE) .......................... 10 2007 013 557

(51) Int. Cl.
*G01H 1/00* (2006.01)
(52) U.S. Cl. ........................................................ 73/579
(58) Field of Classification Search .................... 73/579, 73/290 V
See application file for complete search history.

(56) References Cited

U.S. PATENT DOCUMENTS

| | | | |
|---|---|---|---|
| 3,266,311 A | 8/1966 | Andreasen | |
| 3,712,117 A | 1/1973 | Fitzgerald et al. | |
| 7,327,272 B2 * | 2/2008 | Ferraro | 340/612 |
| 2005/0103096 A1 * | 5/2005 | Jakoby et al. | 73/54.02 |
| 2005/0140522 A1 * | 6/2005 | Heilig et al. | 340/870.01 |
| 2007/0188237 A1 * | 8/2007 | Chamla et al. | 330/295 |
| 2010/0083752 A1 * | 4/2010 | Malinek | 73/32 R |

FOREIGN PATENT DOCUMENTS

| | | |
|---|---|---|
| DE | 198 40 796 C1 | 3/2000 |
| DE | 101 61 071 | 6/2003 |
| DE | 10302437 | 8/2004 |
| EP | 1 125 117 B1 | 8/2001 |
| GB | 470167 | 8/1937 |
| WO | WO 03/050479 | 6/2003 |
| WO | WO 03/060482 | 7/2003 |

* cited by examiner

*Primary Examiner* — Peter J Macchiarolo
*Assistant Examiner* — Tamiko Bellamy
(74) *Attorney, Agent, or Firm* — Bacon & Thomas, PLLC

(57) ABSTRACT

An apparatus including: a mechanically oscillatable unit; an exciting/receiving unit; and an electronics unit having an input amplifier and an output amplifier. The amplification factors of the output amplifier and the input amplifier are tunable. The control unit tunes the amplification factor of the output amplifier as a function of damping of the mechanically oscillatable unit in such a manner that the amplitude of the electrical, input signal lies within an amplitude band and that the amplification factor of the output amplifier decreases in the case of lessened damping by the medium and increases in the case of greater damping by the medium, and the control unit tunes the amplification factor of the output amplifier and the amplification factor of the input amplifier in such a manner that the total amplification factor of the electronics unit equals a predeterminable value.

6 Claims, 2 Drawing Sheets

APPARATUS FOR ASCERTAINING AND/OR MONITORING A PROCESS VARIABLE OF A MEDIUM

TECHNICAL FIELD

The invention relates to an apparatus for ascertaining and/or monitoring at least one process variable of a medium in a container.

BACKGROUND DISCUSSION

Such an apparatus includes: at least one mechanically oscillatable unit, wherein the mechanically oscillatable unit is an oscillatory fork, a single rod, or a membrane oscillator; at least one exciting/receiving unit, which excites the mechanically oscillatable unit, such that it executes mechanical oscillations, and which receives mechanical oscillations of the mechanically oscillatable unit; and at least one electronics unit, which supplies the exciting/receiving unit with an electrical, exciter signal $S_E$, also referred to herein as output signal $S_E$, and which receives from the exciting/receiving unit an electrical, received signal $S_R$, also referred to herein as input signal $S_R$. Provided in the electronics unit are at least one input amplifier and at least one output amplifier. The electronics unit exhibits a total amplification factor. The electronics unit serves especially for feedback. The medium is, for instance, a liquid or a bulk good. The process variable is, for example, fill level, density or viscosity of the medium.

In the state of the art, measuring devices are known, in which a so-called oscillatory fork, as a mechanically oscillatable unit, is excited to execute oscillations. Since the oscillations, i.e. their characterizing variables, such as frequency, amplitude and phase, depend on whether there is contact with a medium, and then on its properties, such as density or viscosity, such variables can be deduced from the characterizing variables of the oscillations. Thus, such a measuring device makes possible, for instance, the monitoring of fill level or the measuring of density of the medium.

A difficulty is that the amplitude of the input signals $S_R$ of the electronics unit, thus the received signals from the mechanically oscillatable unit, can differ widely. For instance, if the oscillatable unit is oscillating not covered by the medium, then a large amplitude results, while, when the oscillatable unit is covered by the medium, then the amplitude decreases, on occasion, considerably. Such behavior is associated in the electronics with problems such as amplitude-dependent phase shifting, non-linearity, signal-noise separation, and/or saturation. Furthermore, the amplifier has to be correspondingly designed, in order to be able to cover the resulting dynamic range.

SUMMARY OF THE INVENTION

An object of the invention is to provide a measuring apparatus of the described kind, in which the required amplitude dynamics of the feedback electronics lies within a predeterminable range.

The invention achieves the object by features including that: the amplification factor of the output amplifier is tunable; the amplification factor of the input amplifier is tunable; the control unit tunes the amplification factor of the output amplifier as a function of the damping of the mechanically oscillatable unit by the medium, in such a manner that the amplitude of the electrical input signal $S_R$ lies essentially within a a predeterminable amplitude band and the amplification factor of the output amplifier decreases in the case of lessened damping by the medium and increases in the case of greater damping by the medium; and the control unit tunes the amplification factor of the output amplifier and the amplification factor of the input amplifier in such a manner, that the total amplification factor of the electronics unit is essentially equal to a predeterminable value.

An idea of the invention, thus, lies in suitably controlling the amplification factor of the electronics, for example by a suitable control of the output amplifier, so that the mechanically oscillatable unit is supplied, in each case, with a signal of such amplitude for excitation, that the signal, in turn, tapped from the oscillatable unit lies within a predeterminable dynamic range. i.e., the feedback electronics is controlled in such a manner that, taking into consideration the damping sustained by the mechanically oscillating unit in interacting with the medium, the input of the feedback electronics receives only signals whose amplitudes lie within a desired range and this, especially, independently of the degree of covering of the fork, or independently of the amplitude damping by the interaction of the medium with the oscillatable unit. Especially, in the case where the medium and the damping by the medium are constants, the amplitude of the input signal $S_R$ is essentially proportional to the amplitude of the output signal $S_E$. Especially in such case, the amplification factor of the output amplifier is controlled according to the applied signal, or according to the fill level, or according to the damping by the medium, or according to the necessary amplification. In such case, the amplification of the output amplifier is tuned in such a manner that a greater damping by the medium leads to an increase of the amplification factor, and a lesser damping to tuning the amplification factor lower. In the case of damping by the covering of the oscillatable unit by the medium, a greater degree of covering (i.e. a greater damping) is thus associated with a greater amplification factor.

The tuning of the amplification of the electronics unit is thus focused on one element of the electronics unit. Essential in such case is that the sum of all amplifications is greater than, or equal to, one. This is achieved, among other things, by tuning the amplification factor in the input amplifier correspondingly to the tuning of the amplification of the output amplifier, so that, in total, a predeterminable amplification factor results over the electronics unit. i.e., an increasing of the amplification factor of the output amplifier leads to a decreasing of the amplification factor of the input amplifier. Similar considerations hold for the lessening of the amplification factor of the output amplifier.

An embodiment includes that the control unit tunes the amplification factor of the electronics unit and/or the output amplifier in such a manner that the amplification factor is less in the case in which the mechanically oscillatable unit is not covered by the medium than in the case in which the mechanically oscillatable unit is covered by the medium. The amplification factor of the input amplifier is correspondingly retuned. In this embodiment, thus, the amplification factor of the electronics unit, as a whole, or, specially the output amplifier, is tuned. If the oscillatable unit is covered by the medium, then, therewith, also the amplitude of the oscillations is lessened, i.e. the amplitude of the input signal $S_R$ is correspondingly smaller. If, however, the oscillatable unit oscillates not covered by the medium, or only a little covered, then there is no, or only very little, lessening of the oscillation amplitude, i.e. the input signal $S_R$ has quite possibly the same amplitude as the output signal $S_E$. If, now, according to the invention, the amplification factor in the 'covered' case is tuned greater than in the 'freely oscillating' case, then, with suitable tuning of the values, it results that the amplitude of the input signal $S_R$ lies essentially within a predeterminable range, i.e. the input amplifier needs only to be designed for a small dynamic range. In an embodiment, a linear tuning of the amplitude factor exists between the two extreme values, free oscillation and completely covered oscillation.

An embodiment provides that the electronics unit produces the electrical output signal $S_E$ in such a manner that the mechanically oscillatable unit executes fundamental-wave oscillations. The mechanically oscillatable unit thus executes oscillations of the fundamental mode.

An embodiment includes that the electronics unit produces the output signal $S_E$ in such a manner that the electrical output signal $S_E$ is an alternating voltage.

An embodiment provides, that the electronics unit produces the electrical output signal $S_E$ in such a manner that the electrical output signal $S_E$ is a sinusoidal, alternating voltage.

An embodiment includes that the control unit is a microprocessor. Alternatively, a microprocessor, or microcontroller, is a component of the control unit.

BRIEF DESCRIPTION OF THE DRAWINGS

The invention will now be explained in greater detail on the basis of the appended drawings, the figures of which show as follows.

DETAILED DISCUSSION

Figure 1:
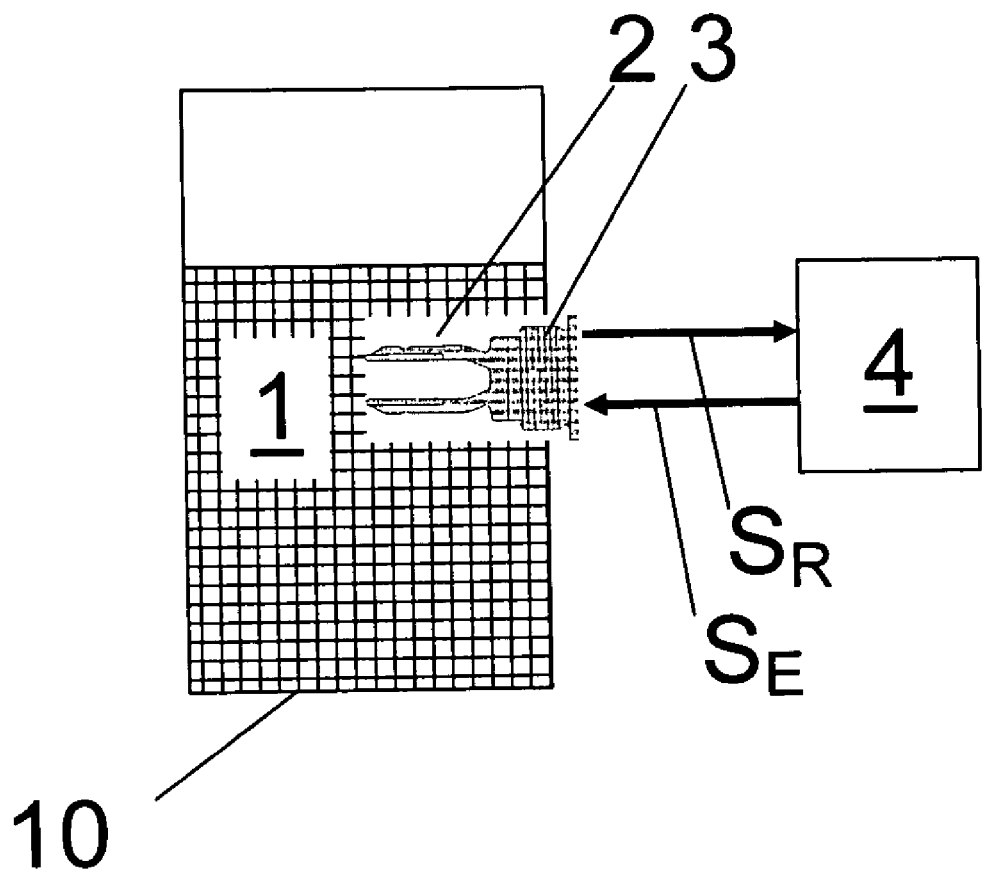
FIG. 1 a schematic representation of the measuring apparatus of the invention in an application.

FIG. 1 shows, schematically, application of a measuring apparatus of the invention. Located in a container 10 is a medium 1, for example, a liquid. In order to monitor the fill level of the medium 1 or to measure, or also monitor, the density of the medium 1, the measuring apparatus with the mechanically oscillatable unit 2 is mounted on the container 10. The mechanically oscillatable unit 2 is, in the illustrated case, an oscillatory fork, i.e. two, so-called fork-tines mounted on a shared membrane. Behind the membrane is the exciting/receiving unit 3, which functions as a transducer between mechanical oscillations and electrical signals. In this case, it is, for example, a piezoelectric element. The exciting/receiving unit 3 is supplied by the electronics unit 4 with an exciter signal $S_E$, which is an electrical, alternating voltage. This signal is converted by the unit 3 into a mechanical oscillation of the mechanically oscillatable unit 2. Conversely, the exciting/receiving unit 3 receives the mechanical oscillations of the oscillatable unit 2 and produces therefrom a received signal $S_R$, which is fed to the electronics unit 4. From the characterizing variables of the received signal $S_R$, which, likewise, is an electrical, alternating voltage, then the process variables of interest are ascertained.

Figure 2:
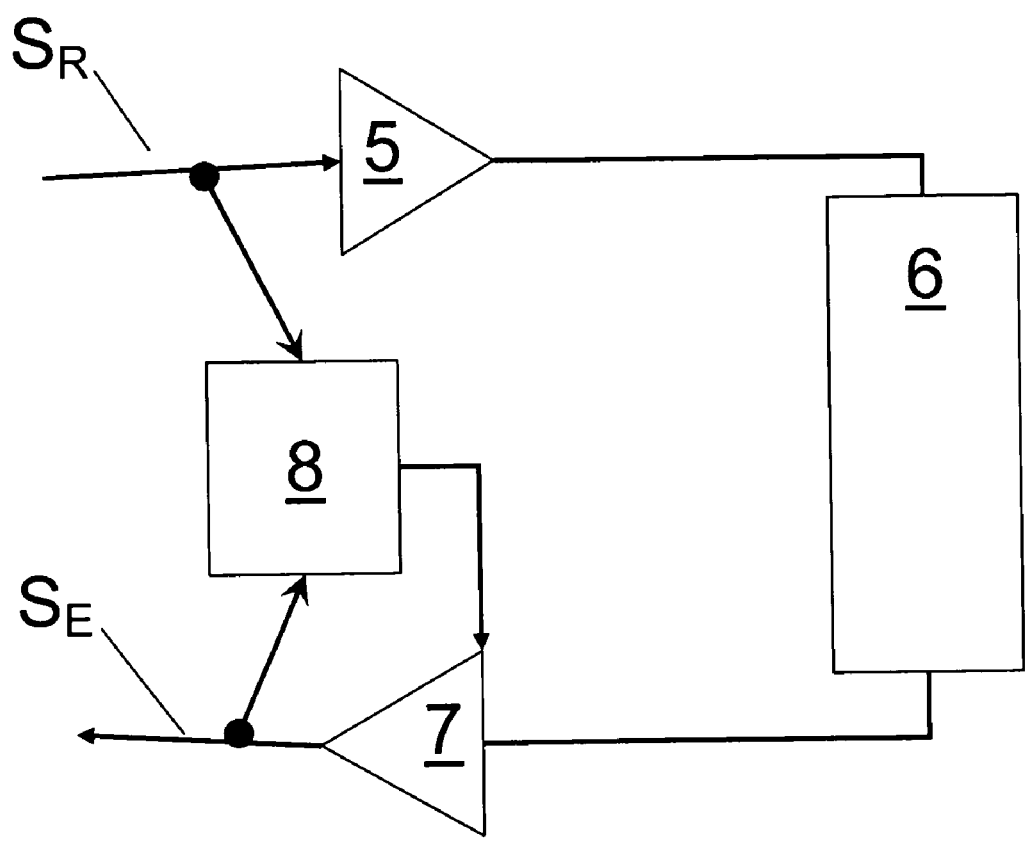
FIG. 2 a schematic representation of an embodiment of an electronics unit of the measuring apparatus of the invention.

FIG. 2 shows the components in the electronics unit 4 of the invention. The received signal $S_R$ is amplified by a receiving amplifier 5 and fed to an evluauating unit 6. There, evaluation takes place as regards fill-level, density, viscosity, or, generally, the process variables to be monitored or measured. If, for instance, fill level is of concern, than a lessening of the oscillatory frequency is interpreted, for example, to mean that the medium has reached the oscillatable unit 2. The amplified signal is then fed, following evaluation and, on occasion, required further processing, e.g. a filtering, via the output amplifier 7, back to the exciting/receiving unit 3, in order, so, to produce continuous oscillation. In such case, the output signal $S_E$, also called the exciter signal $S_E$, is preferably a sinusoidally shaped, alternating voltage. According to the invention, a control unit 8 is provided, which, here, directly evaluates the received signal $S_R$ and, based on information concerning degree of covering, tunes the amplification factor of the output amplifier 7. In an alternative embodiment, the control unit 8 is a component of the evaluating unit 6.

If the received signal $S_R$ shows that the mechanically oscillatable unit 2 is oscillating free of the medium 1, or that the damping by the medium is only slight, then the amplification factor of the output amplifier 7 is reduced. This effects automatically that also the amplitude of the received signal $S_R$ becomes smaller, since the mechanically oscillatable unit 2 is then excited with a signal of lesser amplitude. Simultaneously, the amplification factor of the input amplifier 5 is increased, in order that the total amplification factor of the electronics unit 4 is essentially equal to a predetermined value.

If e.g. evaluation of the frequency of the oscillations shows that the mechanically oscillatable unit 2 is covered by medium 1, or that the damping is high, then the amplification factor of the output amplifier 7 is increased again, so that also the amplitude of the received signal $S_R$ becomes greater. Correspondingly, the amplification factor of the input amplifier 5 is decreased, so that the total amplification of the electronics unit equals a predeterminable value. Preferably stored in the control unit 8 is how the amplification factors of output amplifier 7 and input amplifier 5 are to be tuned as a function of degree of covering, or degree of damping, by the medium, so that the amplitude of the received signal $S_R$ lies within a predeterminable range. Alternatively, this happens via a control procedure, wherein the control unit 8 measures the amplitude of the received signal $S_R$ and, under the assumption that the fill level has not changed in the meantime, suitably tunes the amplification factor. In the case shown in FIG. 2, the amplification factor of the electronics unit 4 is tuned via the amplification factor of the output amplifier 7.

The invention claimed is:

1. An apparatus for ascertaining and/or monitoring at least one process variable of a medium in a container, comprising:
   at least one mechanically oscillatable unit, wherein the mechanically oscillatable unit is an oscillatory fork, a single rod or a membrane oscillator;
   at least one exciting/receiving unit, which excites said mechanically oscillatable unit to execute mechanical oscillations and which receives the mechanical oscillations of said mechanically oscillatable unit; and
   at least one electronics unit, which supplies said exciting/receiving unit with an electrical, output signal, and which receives from said exciting/receiving unit an electrical, input signal, wherein:
   a control unit; at least one input amplifier, and at least one output amplifier are provided in said electronics unit, said electronics unit has a total amplification factor;
   the amplification factor of said output amplifier is tunable, the amplification factor of said input amplifier is tunable, said control unit tunes the amplification factor of said output amplifier, as a function of damping of said mechanically oscillatable unit by the medium, in such a manner that the amplitude of the electrical, input signal lies essentially within a predeterminable amplitude band and that the amplification factor of said output amplifier decreases in the case of lessened damping by the medium and increases in the case of greater damping by the medium; and
   said control unit tunes the amplification factor of said output amplifier and corresponding to said timing of said output amplifier tunes the amplification factor of said input amplifier in such a manner that the total amplification factor of said electronics unit is essentially equal to a predeterminable value.

2. The apparatus as claimed in claim 1, wherein:
said control unit tunes the amplification factor of one or both of said electronics unit and said output amplifier in such a manner that the amplification factor for a case in which said mechanically oscillatable unit is not covered by the medium is less than for a case in which said mechanically oscillatable unit is covered by the medium.

3. The apparatus as claimed in claim 1, wherein:
said electronics unit produces the electrical, output signal in such a manner that said mechanically oscillatable unit executes fundamental wave oscillations.

4. The apparatus as claimed in claim 1, wherein:
said electronics unit produces the electrical output signal in such a manner that the electrical output signal is an alternating voltage.

5. The apparatus as claimed in claim 4, wherein:
said electronics unit produces the electrical output signal in such a manner that the electrical, output signal is a sinusoidal, alternating voltage.

6. The apparatus as claimed in claim 1, wherein:
said control unit is a microprocessor.

* * * * *